(12) United States Patent
Nowell et al.

(10) Patent No.: US 11,078,903 B2
(45) Date of Patent: Aug. 3, 2021

(54) TAPERED VALVE SEAT

(71) Applicant: Kerr Machine Co., Sulphur, OK (US)

(72) Inventors: Mark S. Nowell, Ardmore, OK (US); Christopher Todd Barnett, Stratford, OK (US); Kelcy Jake Foster, Ardmore, OK (US); Michael Eugene May, Ardmore, OK (US); Michael Cole Thomas, Ardmore, OK (US)

(73) Assignee: Kerr Machine Co., Sulphur, OK (US)

( * ) Notice: Subject to any disclaimer, the term of this patent is extended or adjusted under 35 U.S.C. 154(b) by 4 days.

(21) Appl. No.: 16/111,754

(22) Filed: Aug. 24, 2018

(65) Prior Publication Data

US 2019/0063427 A1 Feb. 28, 2019

Related U.S. Application Data (60) Provisional application No. 62/607,872, filed on Dec. 19, 2017, provisional application No. 62/581,237, filed on Nov. 3, 2017, provisional application No. 62/549,530, filed on Aug. 24, 2017.

(51) Int. Cl.
| | |
|---|---|
| *F04B 53/10* | (2006.01) |
| *F16K 15/06* | (2006.01) |
| *F16K 1/46* | (2006.01) |
| *F16K 1/42* | (2006.01) |
| *F16K 25/00* | (2006.01) |

(52) U.S. Cl.
CPC ...... *F04B 53/1087* (2013.01); *F04B 53/1032* (2013.01); *F16K 1/42* (2013.01); *F16K 1/427* (2013.01); *F16K 1/465* (2013.01); *F16K 15/063* (2013.01); *F16K 25/005* (2013.01)

(58) Field of Classification Search
CPC .......... F16K 25/005; F16K 1/42; F16K 1/427; F16K 1/465; F16K 15/063; F04B 53/1087; F04B 53/1032; F04B 53/10
USPC ......................... 251/332, 333, 359–365, 368
See application file for complete search history.

(56) References Cited

U.S. PATENT DOCUMENTS

| | | | |
|---|---|---|---|
| 1,822,682 A | 9/1931 | Weiger | |
| 3,063,467 A * | 11/1962 | Roberts, Jr. ............. | F16K 1/465 137/516.29 |
| 3,474,808 A | 10/1969 | Elliott | |
| 4,662,392 A * | 5/1987 | Vadasz .................... | F16K 15/04 137/533.11 |
| 4,860,995 A * | 8/1989 | Rogers ................ | F04B 53/1027 251/356 |
| 5,073,096 A * | 12/1991 | King .................... | F04B 53/007 137/516.29 |
| 5,088,521 A * | 2/1992 | Johnson .................. | E21B 21/01 137/516.29 |

(Continued)

*Primary Examiner* — John Bastianelli
(74) *Attorney, Agent, or Firm* — Tomlinson McKinstry, P.C.

(57) ABSTRACT

A valve seat. The valve seat is used in a fluid end of a fracturing pump. The external surface of the valve seat has a tapered portion that retains the valve seat in the fluid end. The external surface also has a portion that is substantially cylindrical. A hardened insert is integrated into a strike face of the valve seat. The tapered portion is at a first end of the valve seat and the tapered portion is at a second end of the valve seat. The second end of the valve seat may be formed such that its exterior surface does not contact the fluid end.

6 Claims, 9 Drawing Sheets

(56) References Cited

U.S. PATENT DOCUMENTS

| | | | |
|---|---|---|---|
| 5,193,577 A * | 3/1993 | de Koning | F04B 53/102 |
| | | | 137/516.29 |
| 5,226,445 A * | 7/1993 | Surjaatmadja | F16K 15/063 |
| | | | 137/516.29 |
| 5,299,921 A * | 4/1994 | Richter | F04B 53/1022 |
| | | | 285/125.1 |
| 5,370,148 A | 12/1994 | Shafer | |
| D383,053 S | 9/1997 | Schrader et al. | |
| 6,257,626 B1 | 7/2001 | Campau et al. | |
| D616,966 S | 6/2010 | Angell | |
| 7,726,026 B1 * | 6/2010 | Blume | F16K 15/06 |
| | | | 29/890.129 |
| D631,142 S | 1/2011 | Angell | |
| D731,035 S | 6/2015 | Lo Cicero | |
| D737,497 S | 8/2015 | Burgess et al. | |
| D748,228 S | 1/2016 | Bayyouk et al. | |
| D787,029 S | 5/2017 | Bayyouk et al. | |
| 9,822,894 B2 | 11/2017 | Bayyouk et al. | |
| D806,241 S | 12/2017 | Swinney et al. | |
| 2011/0173814 A1 | 7/2011 | Patel | |
| 2013/0020521 A1 * | 1/2013 | Byrne | F16K 1/385 |
| | | | 251/334 |
| 2013/0202458 A1 * | 8/2013 | Byrne | F04B 53/10 |
| | | | 417/279 |
| 2014/0070127 A1 * | 3/2014 | Blume | F16K 1/42 |
| | | | 251/359 |
| 2015/0084335 A1 | 3/2015 | Farrell et al. | |
| 2015/0144826 A1 * | 5/2015 | Bayyouk | F16K 25/005 |
| | | | 251/359 |
| 2019/0011051 A1 | 1/2019 | Yeung | |

\* cited by examiner

TAPERED VALVE SEAT

FIELD

This technology relates generally to sealing fluid flow passages inside flow control devices, such as those particularly suited for use in high pressure oil and gas production and processing systems.

SUMMARY

The invention is directed to a valve seat. The valve seat comprises an annular body and an insert. The annular body has a first end and a second end. The first end defines a tapered exterior surface having a frusto-conical first taper conforming to a portion of the pump assembly. The second end defines an internally disposed strike face. The insert is disposed within the second end of the body. The insert is harder than the body and a portion of the insert is integrated with the strike face.

DETAILED DESCRIPTION

Figure 1:
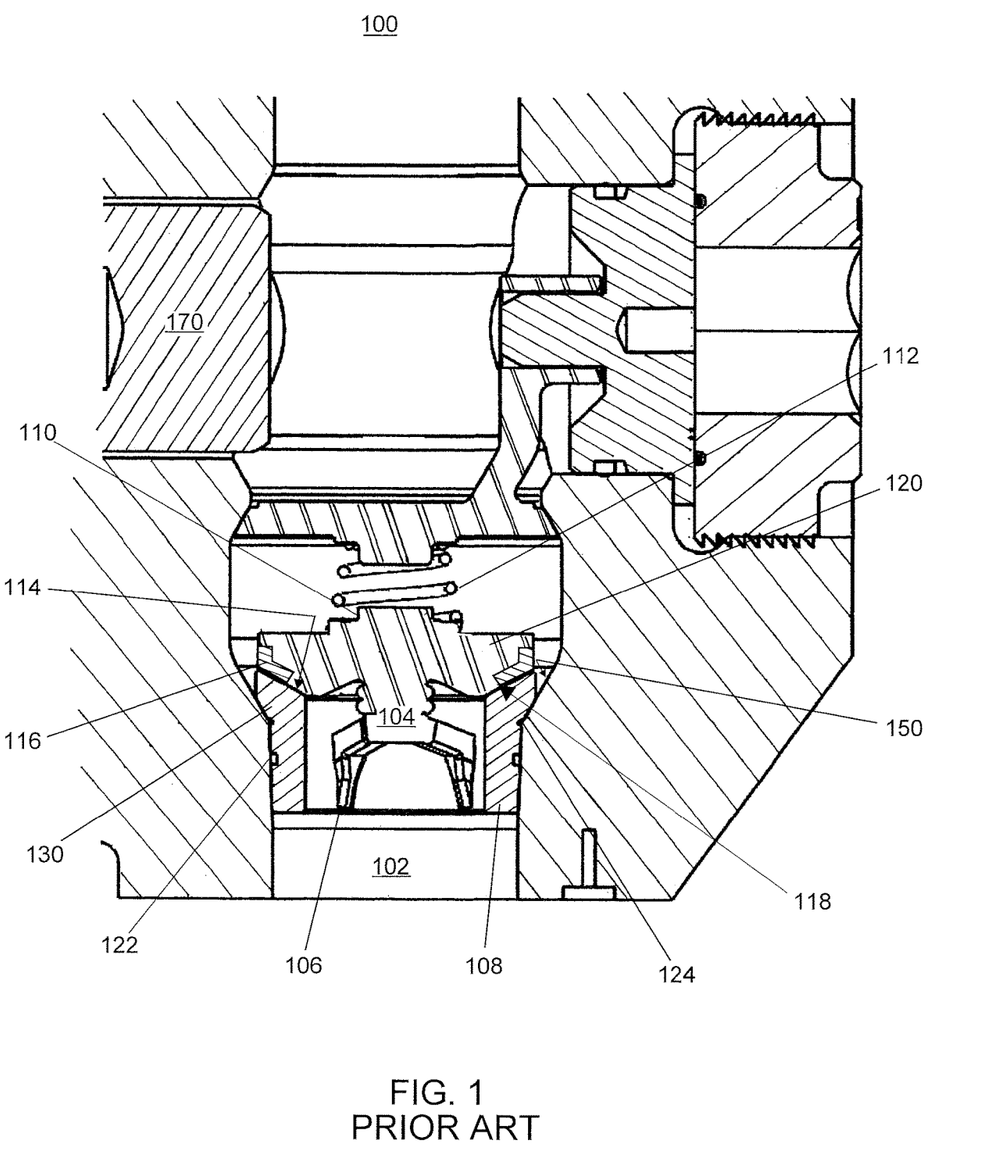
FIG. 1 is a sectional side view of a fluid end having a prior art valve seat for explanatory purposes
Figure 2:
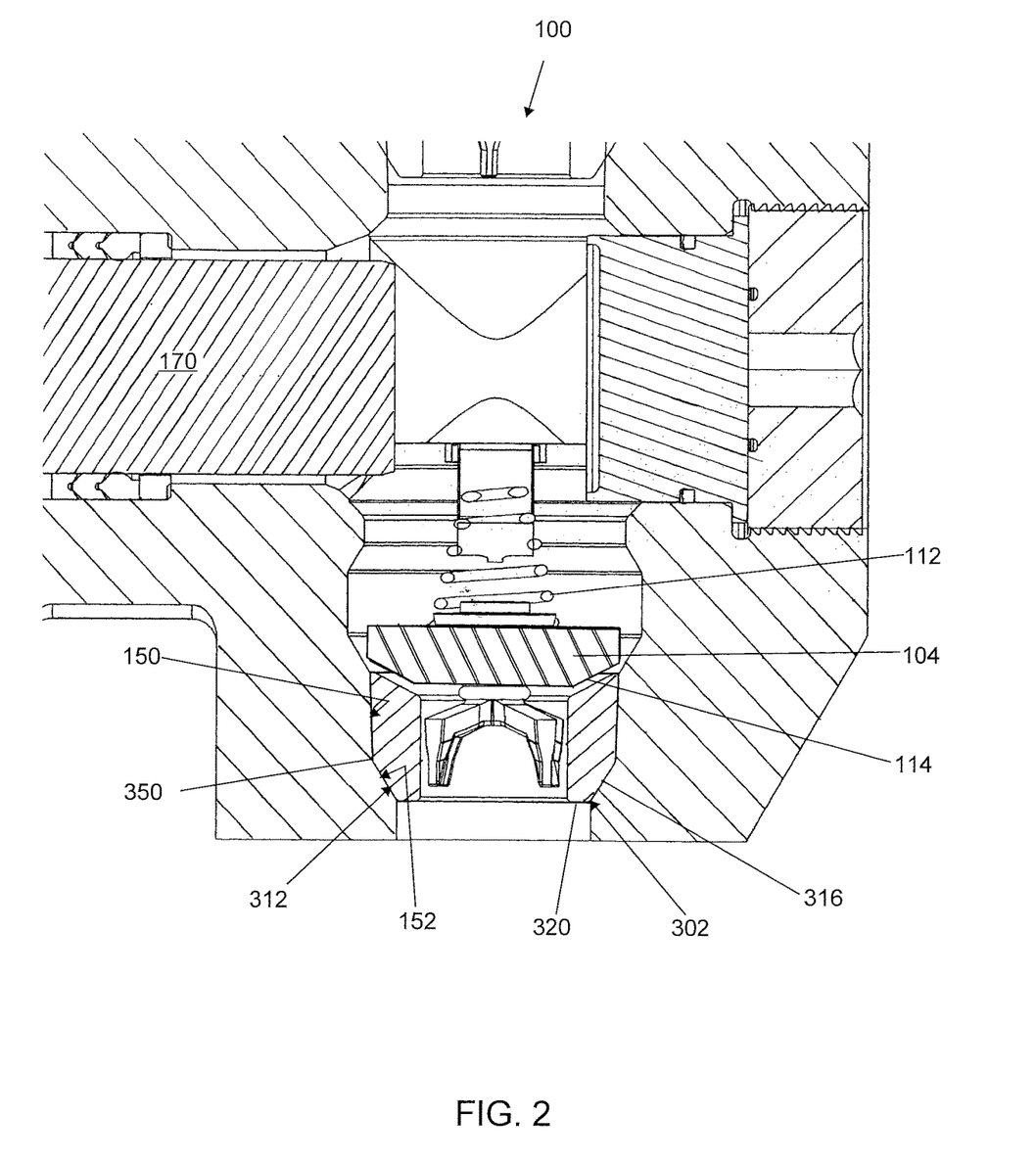
FIG. 2 is a sectional side view of a fluid end having a tapered valve seat.
Figure 5:
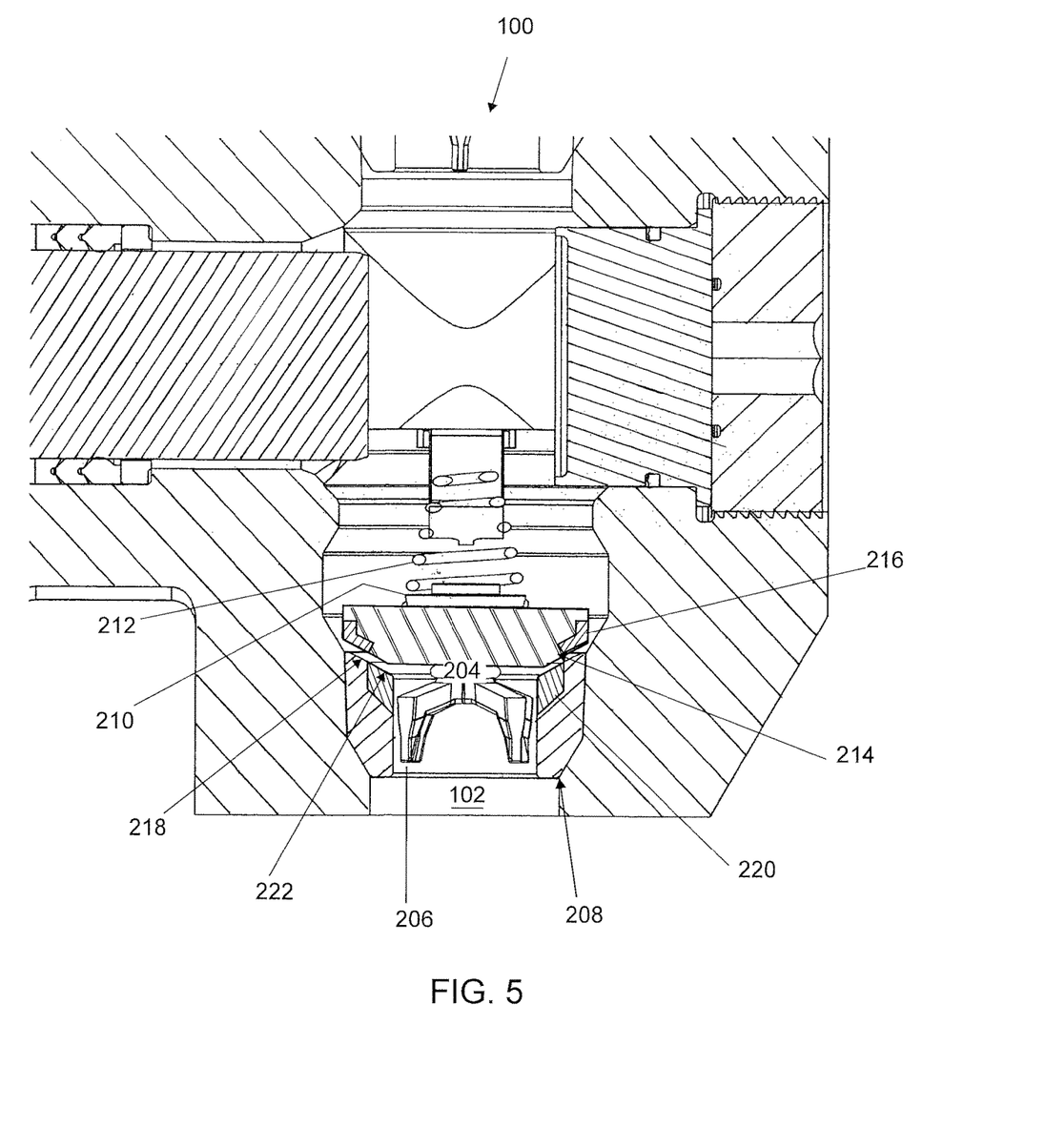
FIG. 5 is a sectional side view of a fluid end having a tapered valve seat containing an insert.

With reference to FIGS. 1, 2 and 5, shown therein is a fluid end 100. A fluid end 100 is the flow control sub-assembly of a high-pressure reciprocating piston pump. Pumps of this type are used in the oil industry to provide high pressure for tasks such as drilling, formation stimulation, also known as fracking, and completed well servicing. They are often referred to as high pressure hydraulic fracturing pumps. The most common design of such a pump includes two sub-assemblies, the power end (not shown) and the fluid end 100.

The power end converts the rotational input of a drive source to the reciprocating linear motion of pistons 170, usually with a crankshaft arrangement. The internal components of the power end are enclosed in a relatively clean, lubricated environment and have a much longer service life than the components of the fluid end.

The fluid end 100 controls the flow of the fluid pressurized by the pistons 170. The pistons 170 are attached to the crank rods of the power end. The sealing integrity of fluid ends must withstand not only high operating fluid pressures, presently 15,000 pounds per square inch and higher, but also must do so while controlling the flow of corrosive and/or abrasive fluids that are notorious for eroding the internal components of typical fluid ends. This abrasiveness and/or corrosiveness, combined with high flow rates used in standard service, dramatically shorten the life of typical fluid ends when compared to that of typical power ends.

Fluid ends 100 typically have from two to five or more identical sections consisting of components that accomplish the purpose described above. Each fluid end comprises valves 104. The valves 104 control the inlet of low pressure fluid and outlet of high pressure fluid from each fluid end 100 section.

The valves 104 are typically identical and are an assembly that has a body 120, a return mechanism, such as a spring 112, and a sealing face 114 formed on the body. The valves 104 are positioned within the inlet and outlet sections to control fluid flow in and out of the fluid end 100. As shown in FIGS. 1, 2 and 5, the valve 104 is in an inlet section 102 of the fluid end 100.

Each sealing face 114 seals against a valve seat. A valve seat is typically a tube that has been hardened, or is made of harder material than the fluid end, that is to installed in the inlet and outlet sections of the fluid end. The valve seat and provides a hardened sealing surface for the sealing face 114 of the valve 104 to seal against. Without the hardened sealing surface of the valve seat the area would quickly erode reducing the service life of the fluid end.

Recent developments in the energy exploration industry require an increased maximum sustained pressure in pumps from around 8,000 psi to 15,000 psi or more with expected maximum spikes up to 22,500 psi. This increase in maximum pressure causes failures in components not seen at lower pressures. Typical failures now include the failure of valves due to erosion of the valve sealing face 114 and seat sealing face 118 which is accelerated by the large closing forces of the valve sealing face against the valve seat sealing face. When either sealing face fails leakage occurs around the component. Leakage reduces the maximum pressure and flow capabilities of the system. Leakage of an abrasive fluid at such high pressures quickly erodes the area requiring repair or replacement of the entire fluid end. A fractured fluid end body is always a catastrophic failure requiring replacement.

Efforts to eliminate the erosion of the valve sealing face have included hardening both sealing faces. The mating hardened surfaces provide an improved seal and allow the system to operate as desired. However, the impact of the hardened valve sealing face against the valve seat sealing face increases the erosion rate of both surfaces due to the closing force imparted to the valve by the valve return spring and the internal pressures of the fluid end. This failure occurs in an unacceptably short time requiring repair or replacement of the valve and/or the valve seat Improvements are needed in the internal sealing of fluid ends to increase operating life while reducing downtime and operating cost.

With reference to FIG. 1, fluid end 100 comprises a prior art valve seat 108. The inlet passage, or port 102 is shown with the valve 104 in the closed position. The valve 104 body 120 has an alignment structure 106 and a protrusion no. The alignment structure 106 assists in maintaining proper valve 104 orientation to a valve seat 108 when in operation. Protrusion 110 centers a coil spring 112 that is typically used to apply a closing force to the valve 104 during operation. When the valve 104 is closed by the coil spring 112, the valve sealing face 114 contacts the valve seat 108.

The valve seat 108 is installed in the inlet port 102. Typically, the valve seat 108 is precisely machined to fit in the fluid end 100. This fit may be close enough to prevent the gap between the seat 108 and fluid end 100 from leaking. It is typical to have a seal located in a seal groove 122 on the outside diameter of the seat 108 to keep the joint from leaking. The valve seat 108 is installed by inserting it into an appropriately sized fluid passage bore 150 in the inlet port 102 of the fluid end 100. The valve seat 108 has a tapered flange 130. The valve seat flange 130 bottoms out on the valve seat bore 150.

The seat 108 defines a sealing surface 118 that is complementary to the sealing surface 114 of the body 120. The valve sealing surface 114 contacts the seat sealing surface 218 stopping fluid flow.

The valve seat flange 130 resists the tendency of the valve seat HA to be driven deeper into the inlet port 102 by the forces produced by the fluid end. These flanges 230 typically form the upper portion of a valve seat 108. As shown, the flange 130 meets the remainder of the valve seat 108 at a transition point 124. The transition point 124 may be the apex of a ninety degree to one hundred eighty degree external angle on the outer surface of the valve seat 108. In all such valve seats 108, the transition point has an external angle of less than one hundred eighty degrees.

There is a stress concentration at the transition point 124 which is a typical failure point. Attempts to reduce the stress concentration by adding a stress relief groove have been unsuccessful. A sharp transition at the flange additionally produces a stress concentration in the fluid end 100 body and increases the likelihood of cracking the internal wall of the fluid end 100 body in that area. Typically, the wall thickness of the fluid end 100 body has been increased in this area to reduce these failures however size and cost restraints prevent adequate increases in the wall thickness.

The sealing surface 114 may be hardened by a post manufacturing process, such as nitriding or flame hardening, or is manufactured from a hard material such as carbide. It is advantageous to have the hardened valve sealing surface 114 to minimize erosion. Seat 108 may also have the seat sealing surface 118 hardened by a post manufacturing process like those performed on the valve sealing surface 114. However, the press fit or close fit method of installation combined with the residual stresses from the post manufacturing process make it extremely difficult to install the seat 108 without breaking it. Because of these installation difficulties, seat 108 is typically made entirely of carbide or some other hard material thus reducing, but not eliminating, installation difficulties.

A valve insert 116 may be placed in the body 120 at the sealing surface 114, and may be either permanently attached or replaceable. The valve insert 116 can be made of any of a number of elastomeric materials. The purpose of valve insert 116 is to provide more sealing capability for the valve 104. While the primary sealing is accomplished by the metal to metal contact of the valve sealing surface 114 to the seat sealing surface 118, it is advantageous to have the elastomeric material encapsulate and seal around any solids trapped between the valve insert 116 and the seat sealing surface 118.

During operation the valve 104 reciprocates axially between open and closed positions. In the open position fluid flow occurs and in the closed position fluid flow is blocked.

As the valve 104 moves from the open position to the closed position the valve insert 116 contacts the seat sealing surface 118 first and deforms around any trapped solids. Once the valve insert 116 deforms, or compresses, axially the valve sealing surface 114 contacts the seat sealing surface 118 and stops moving. Erosion occurs with each cycle in large part due to the impact of the valve sealing surface 114 on the seat sealing surface 118.

The repeated impacts of both sealing surfaces 114, 118 erode only in the area that the two surfaces 114, 118 contact each other and are typically the point of failure. Repair of the fluid end 100 requires the replacement of both the valve 104 and the seat 108. The replacement cost of a carbide seat 108 is very expensive and the industry can benefit from an improvement that reduces this cost.

With reference to FIG. 2-4B, the fluid end 100 contains an improved valve seat 302. The valve seat 302 has no flange 130 (FIG. 1). Rather, as best shown in FIGS. 3A and 3B, the valve seat has a body 304 with an annular ring portion 306 and a tapered lower portion 312. The annular ring portion 306 has an outer surface 308 that is substantially cylindrical and an inner surface 310 that is substantially complementary to a cylinder. A slight taper may be used on the outer surface 308 of the annular ring portion 306.

Figure 3A:
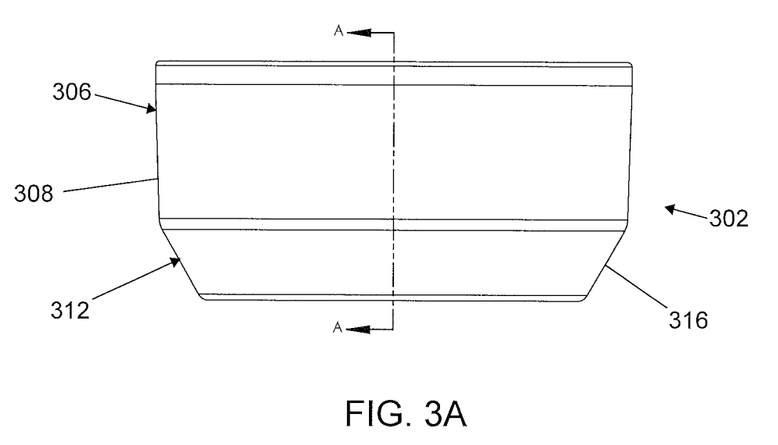
FIG. 3A is a side view of the valve seat shown in FIG. 2.
Figure 3B:
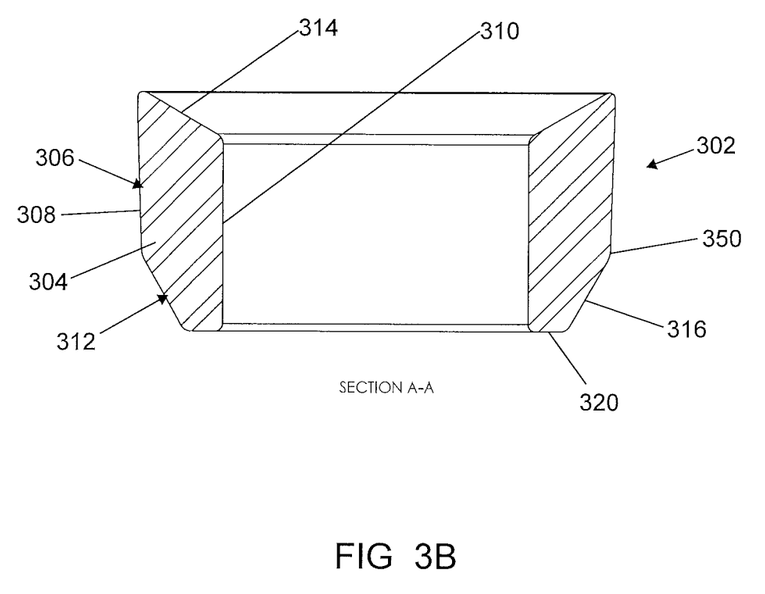
FIG. 3B is a sectional view of the valve seat of FIG. 3A along line A-A.

A seat sealing surface 314 is disposed at a first extremity of the annular ring portion. The sealing surface 314 is complementary to the valve sealing surface 114 of the valve 104 body 120.

The tapered lower portion 312 generally is defined by a continuation of the inner surface 310, but having a tapered outer surface 316. The internal bore 150 has an internal taper 152 that corresponds to the tapered portion 312 of the valve seat 302 body 304. The tapered outer surface 316 and outer surface 308 meet at a transition point 350. The transition point 350 has an external angle of greater than one hundred eighty degrees. Thus, the transition point 350 has reduced stress as compared to that of the prior art.

The tapered portion 312 terminates at a bottom surface 320 of the valve seat 302. As shown, the bottom surface 320 does not contact the internal bore 150 of the fluid end 100. Thus, the force applied through the valve seat 302 to the fluid end 100 body is provided at the internal taper 152 of the internal bore 150. The geometry of valve seat 302 eliminates any transition that would provide a stress concentration point thus increasing the service life of the valve seat 302. Stress applied through the valve seat 302 is evenly distributed on internal taper 152 and tapered outer surface 316, rather than being concentrated at a transition.

Figure 4A:
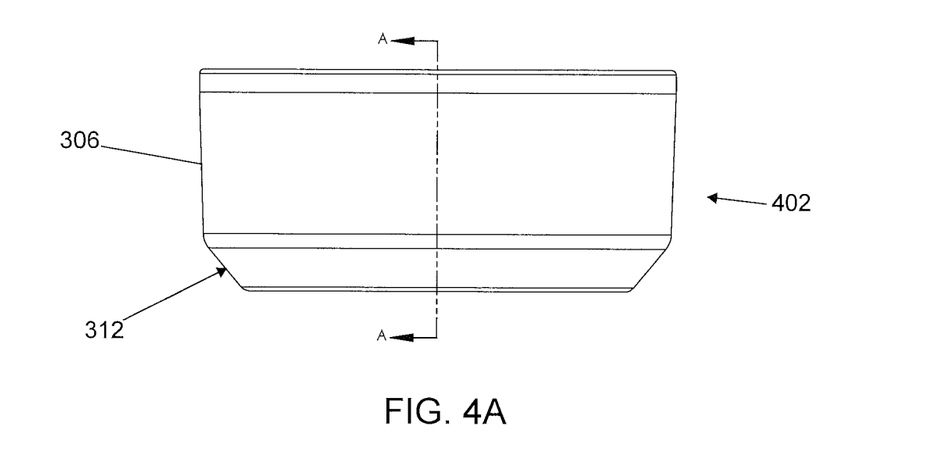
FIG. 4A is a side view of an alternative valve seat.
Figure 4B:
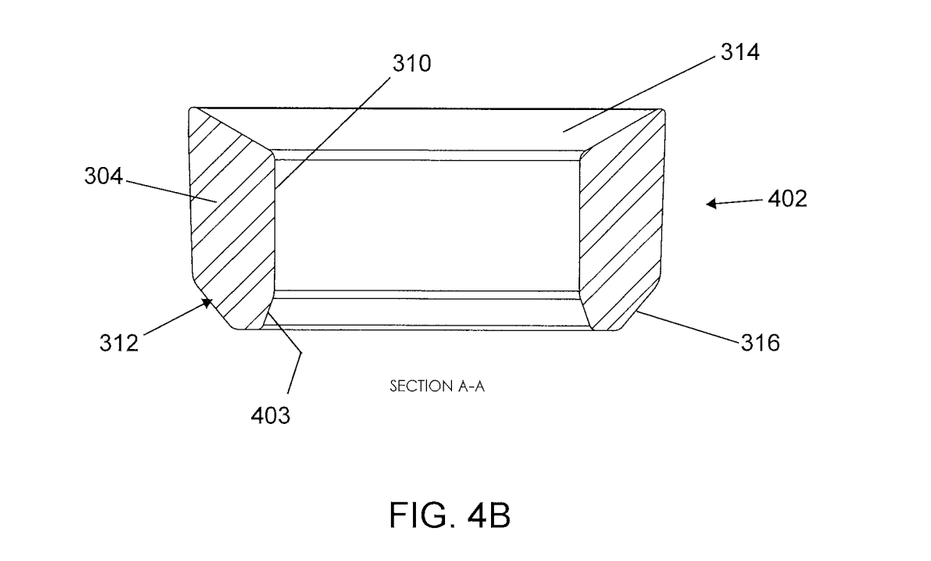
FIG. 4B is a sectional view of the valve seat of FIG. 4A along line A-A.

FIGS. 4A and 4B show an alternative valve seat 402. The valve seat 402 is largely identical to seat 302, but the tapered portion 312 has a tapered inside diameter 403. The tapered inside diameter 403 tends to reduce turbulent flow within the valve seat 402, reducing erosion on the inner surface 310 of the seat 402.

With reference to FIG. 5, an alternative valve 204 and valve seat 208 are shown in a inlet port 102 of the fluid end 100. The valve seat 208 has generally the same geometry as valve seats 302, 402. However, valve seat 208 comprises an insert 220 disposed in the seat sealing surface 218.

The valve 204 comprises a valve sealing surface 214. The valve sealing surface 214 may be hardened by a post manufacturing process, such as nitriding or flame hardening, or may alternatively be manufactured from a hard material such as carbide. It is advantageous to have the hardened valve sealing surface 214 to minimize erosion. The area of the valve sealing surface 214 is larger than that of typical valves, such as the previously attempted solution described above. The larger surface 214 distributes the impact force about a greater area, reducing the impact force at any particular point on the two sealing surfaces 214, 218. Distributing the closing force reduces the amount of erosion caused by the impact force.

A valve insert 216, made of a deformable elastomeric material, may be formed on a portion of the valve sealing surface 214. Valve insert 216 may be similarly formed to insert 116 in FIG. 1, or other known inserts such as that of U.S. Pat. No. 9,435,454, issued to Blume, the contents of which are incorporated herein by reference.

In one embodiment, the valve seat 208 is made of stainless steel or other corrosion resistant material. Typically, however, such material is not hard enough to adequately protect against erosion. Therefore, the seat insert 220 is made of a hardened material, such as tungsten carbide, to resist erosion at the location of repeated contact with the valve sealing surface 214. Seat insert 220 is installed in seat 208 and retained by interference fit, a taper lock design or the like. The insert 220 defines a seat insert sealing surface 222 that is complementary to the valve sealing surface 214.

During operation the valve 204 reciprocates axially between open and closed positions. In the open position fluid flow occurs and in the closed position fluid flow is blocked. As the valve 204 moves from the open position to the closed position the valve insert 216 contacts the seat sealing surface 218 first and deforms around any trapped solids. Once the valve insert 216 deforms, or compresses, axially the valve sealing surface 214 contacts the seat insert sealing surface 222 and stops moving.

Figure 6A:
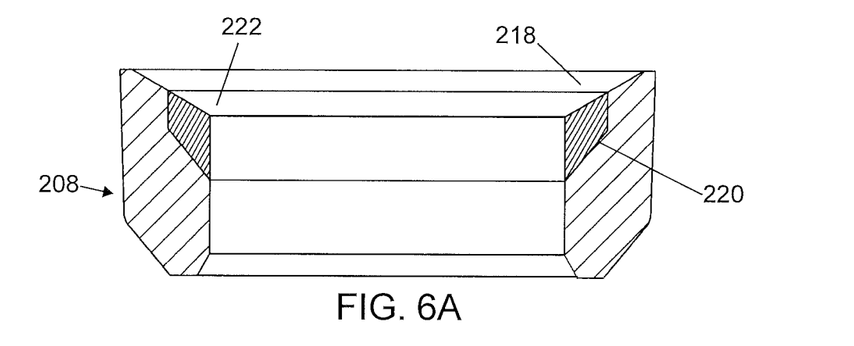
FIG. 6A is a sectional side view of a valve seat containing an insert.
Figure 6B:
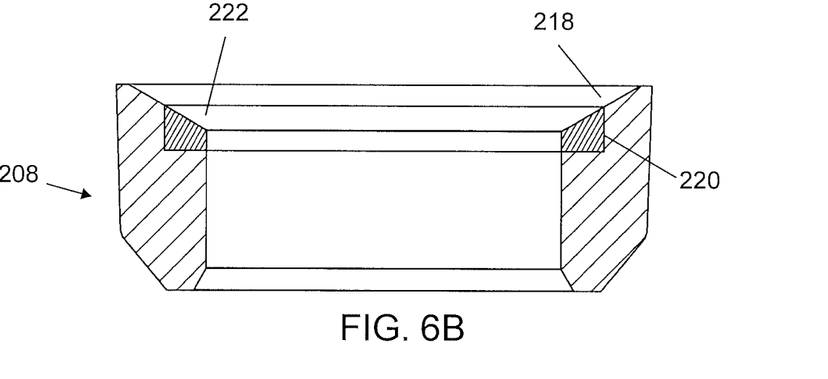
FIG. 6B is a sectional side view of a valve seat containing an insert.
Figure 6C:
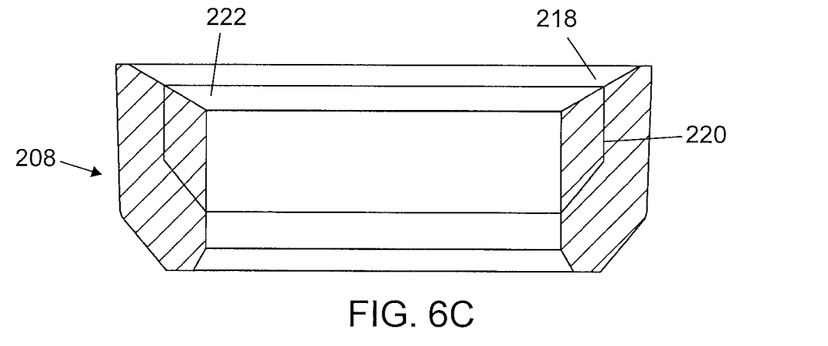
FIG. 6C is a sectional side view of a valve seat containing an insert.

As shown in FIGS. 6A-6C, the seat insert 220 may be characterized by different shapes. The seat insert 220, at the top cylindrical portion, has a larger outer diameter. The sum of the seat insert sealing surface 222 and the seat sealing surface 218, has a larger surface area than conventional valve seats. As discussed with respect to valve sealing surface 214 area, the larger area allows for less force per unit area between the sealing surfaces 214, 218, 222 without reducing the closing force. An additional advantage of the increased outer diameter is that the seat insert 220 may now be installed without decreasing the seat 208 wall thickness to a point where premature failure of the seat 208 will occur.

Additional embodiments are shown in FIGS. 6B and 6C. These embodiments illustrate variations in the installation and retention methods of the seat insert 220 in the seat 208.

While three of the preferred embodiments have been described in detail there are numerous other ways to accomplish this improvement that are also contemplated. Any seat 208 having a separate component that is harder than the base material of the seat and is approximately complementary to the valve sealing surface 218 is contemplated by this improvement. For instance, the seat insert 220 could be the outer diameter of the seat 208 and the inner diameter used to attach the seat insert to the seat by threading, interference fit or the like. This would require the valve sealing surface to also be the outer diameter portion of the valve and the valve insert to be the inner portion of the valve.

Figure 7A:
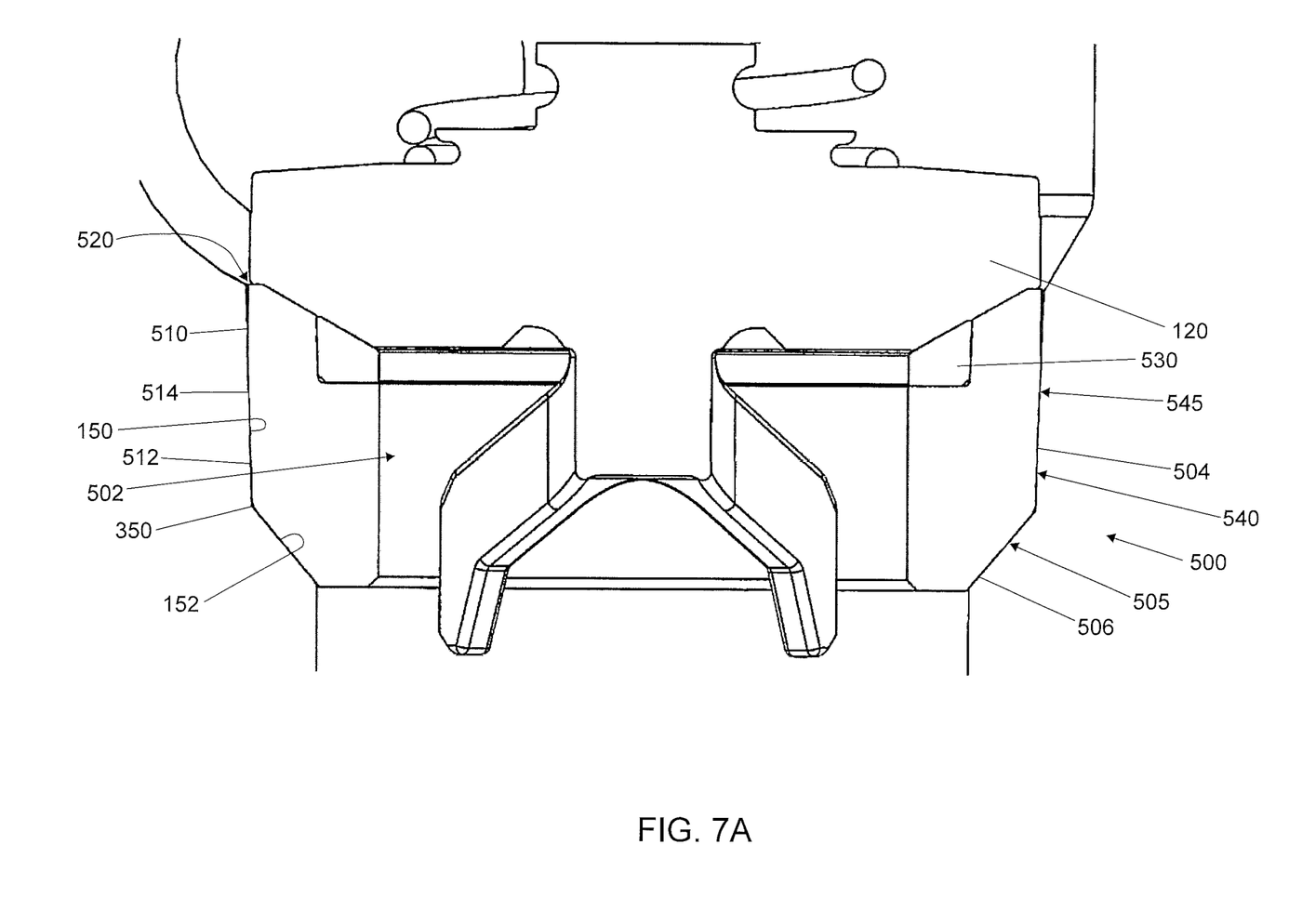
FIG. 7A is a sectional side view of a fluid end having a tapered valve seat.
Figure 7B:
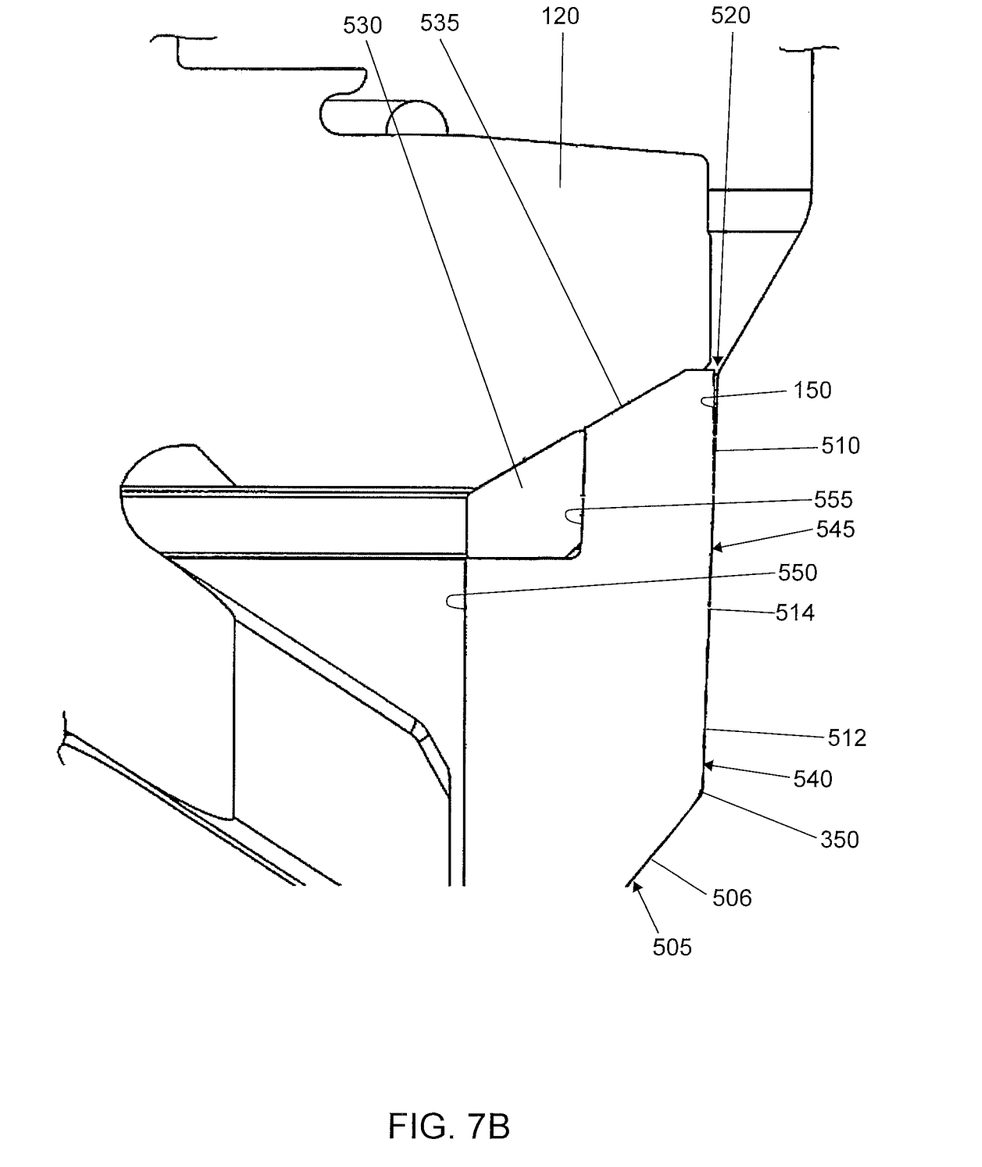
FIG. 7B is a detail view of a gap between the tapered valve seat and valve bore shown in FIG. 7A.

As shown in FIGS. 7A and 7B, a valve seat 500 has an outer surface 504 that may not match the bore 150 of the fluid end 100 precisely. In this embodiment, a valve seat 500 has an annular ring portion 502 with an outer surface 504 and a tapered portion 505 with a tapered portion outer surface 506. The outer surface 504 of the valve seat 500 differs from that of FIG. 2 and FIG. 5, as the angle of the outer surface relative to the internal bore 150 changes more than once along its length. Further, the outer surface 504 only partially conforms to the internal bore 150.

In one embodiment, a first outer surface section 510 and a second outer surface section 512 meet at an angle at transition 514. Transition 514 is generally disposed on a curve around the external surface 504 of the seat 500. It should be understood that the valve seat 500 generally conforms to the bore 150 at the second outer surface section 512 and abuts the bore when seated. In one embodiment, the second outer surface section may be press fit against the bore 150.

As shown best in FIG. 7B, the change in the taper of outer surface 504 at the transition 514 causes the fully seated valve seat 500 to define a gap 520 between the first outer surface section 510 and the bore 150. In one embodiment, the first outer surface section 510 may be offset from the bore 150 by less than 5 degrees. This angle may be less than one degree. It should be understood that the external angle between the first outer surface section 510 and the second outer surface section 512 at the transition 514 is just greater than one hundred eighty degrees. In one embodiment, the external angle at transition 514 is between one hundred eighty and one hundred ninety degrees.

The second outer surface section 512 and the tapered portion outer surface 506 both fully seat against the bore 150. However, gap 520 reduces the tendency of the valve seat 500 to become lodged within the fluid end 100 after repeated impacts between the valve seat 500 and the valve body 120. Therefore, the small gap 520 dramatically improves the ease of removal and replacement of the valve seat 500.

Figure 8:
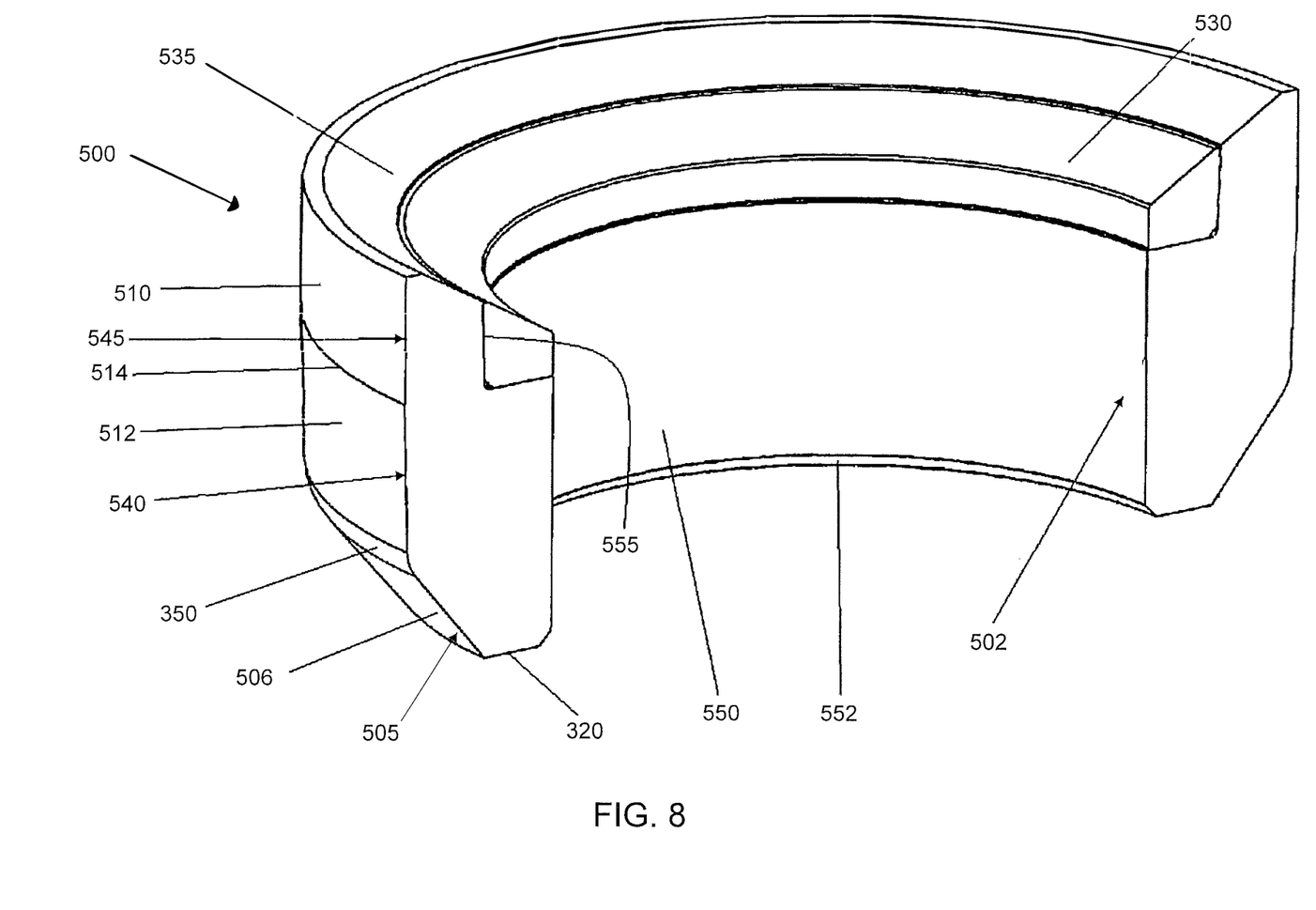
FIG. 8 is a cutaway perspective view of the valve seat shown in FIGS. 7A and 7B.

Thus, in the embodiment of FIG. 8, the valve seat 500 comprises a tapered portion 505, an intermediate portion 540, and a strike face portion 545, each defined by the shape of its outer surface. Generally, a transition point 350 defines the boundary between the tapered portion 505 and intermediate portion 540, while the transition 514 defines the boundary between the intermediate portion 540 and strike face portion 545.

First, the tapered portion 505 is defined by the tapered portion outer surface 506 and an inner surface 550. The inner surface 550 may comprise a surface complementary to the outer surface of a cylinder, or may have an inverse tapered portion or bevel 552 as shown. The inner surface 550 and tapered portion outer surface 506 terminate at the flat bottom surface 320. In the embodiment of the valve seat 500 shown in FIG. 7A, the entire tapered portion outer surface 506 engages the bore 150. None of the bottom surface 320 seats on the bore 150.

Second, the intermediate portion 540 is defined by the inner surface 550 and the second outer surface section 512. The intermediate portion should be of substantially constant thickness, outer diameter, and inner diameter; though a minor taper from the transition 514 to the transition 350 may exist. The taper of the intermediate portion 540 is significantly less per unit length than the taper of the tapered portion 505.

Third, the strike face portion 545 is defined by the inner surface 550, including a portion of the insert 530 that conforms to the inner surface, and the first outer surface section 510. The strike face portion 545 has a strike face 535 which conforms to a surface of the valve body 120. A recess 555 conforms to the insert 530 for seating the same. The portion of the insert 530 forms a part of the strike face 535.

The strike face 535 and inner surface 550 both include, in part, the insert 530. The insert 530 conforms to adjacent surfaces along the strike face 535 and inner surface 550. In the embodiment of FIG. 8, the insert 530 is only disposed in the strike face portion 545. In the embodiment of FIG. 8, the first outer surface section 510 is substantially cylindrical in shape while the adjacent bore 150 has a slight taper (roughly matching second outer surface section 512). Therefore, the strike face section 545 does not contact the bore 150, forming gap 520 (FIG. 7B).

Modifications to this geometry could be made, for example, if the bore 150 abutting the annular ring section 502 is complementary to a cylinder, the first outer surface section 510 could taper slightly inward to generate gap 520.

The strike face portion 545 does not engage the bore 150 at any point. Thus, all bore engagement between the valve seat 500 and bore 150 takes place at the tapered portion 505 and intermediate portion 540.

As shown best in FIG. 8, the entire valve seat 500, inclusive of the insert 530, is ring-shaped, and is defined by a cross-section that has no concave angles. Eliminating concave angles enhances the strength of the valve seat and prevents failure at weak points, such as the weak point at transition 130 (FIG. 1).

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:

1. A valve seat configured to be disposed within a pump assembly, the valve seat comprising:
   an annular body having a first end, a second end, and an intermediate portion disposed between the first end and the second end, in which:
      the first end defines a tapered exterior surface having a frusto-conical first taper conforming to a portion of the pump assembly;
      the second end defines an internally disposed strike face and a cylindrical exterior surface; and
      the intermediate portion is characterized by an exterior surface situated at a convex angle relative to the cylindrical exterior surface of the second end and situated at a convex angle relative to the tapered exterior surface of the first end; and
   an insert disposed within the second end of the body, in which the insert is harder than the body and in which a portion of the insert is integrated with the strike face.

2. A valve seat configured to be disposed within a pump assembly, the valve seat comprising:
   an annular body having a first end, a second end, and an intermediate portion disposed between the first end and the second end, in which:
      the first end defines a tapered exterior surface having a frusto-conical first taper conforming to a portion of the pump assembly; and
      the second end defines an internally disposed strike face and a first exterior surface; and
      the intermediate portion is characterized by a second exterior surface;
      in which the first exterior surface and the second exterior surface intersect and form a first angle; and
      in which the second exterior surface and the tapered exterior surface intersect and form a second angle; and
      in which the second exterior surface has a second taper from the first angle to the second angle;
   an insert disposed within the second end of the body, in which the insert is harder than the body and in which a portion of the insert is integrated with the strike face.

3. The valve seat of claim 2 in which the taper of the second taper is less than the taper of the first taper.

4. A fracturing pump having a fluid passage bore with an internal taper comprising:
   a valve body having a sealing surface; and
   the valve seat of claim 2;
   in which the sealing surface and the strike face are complementary in shape; and
   in which the internal taper of the fluid passage bore is seated against the tapered exterior surface of the first end of the valve seat; and
   in which the first exterior surface does not contact the fluid passage bore.

5. The fracturing pump of claim 4, in which the insert is disposed entirely between a vertex of the first angle and the second end.

6. The fracturing pump of claim 4, in which the second exterior surface is seated against the fluid passage bore.

* * * * *

UNITED STATES PATENT AND TRADEMARK OFFICE
CERTIFICATE OF CORRECTION

PATENT NO. : 11,078,903 B2
APPLICATION NO. : 16/111754
DATED : August 3, 2021
INVENTOR(S) : Mark S. Nowell et al.

It is certified that error appears in the above-identified patent and that said Letters Patent is hereby corrected as shown below:

In the Specification

Column 2, Line 27, please delete the word "to".
Column 2, Line 58, after the word "seat", please insert --.--.
Column 2, Line 65, please delete "no" and substitute therefore "110".
Column 3, Line 21, please delete "HA" and substitute therefore "108".
Column 3, Line 22, please delete "230" and substitute therefore "130".

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*